(12) United States Patent
Thompson et al.

(10) Patent No.: US 11,006,277 B2
(45) Date of Patent: May 11, 2021

(54) METHOD AND SYSTEM FOR SECURITY AND AUTHENTICATION OF AIRCRAFT DATA TRANSMISSIONS (71) Applicant: THOMPSON AEROSPACE, INC., Irvine, CA (US)

(72) Inventors: Mark Steven Thompson, Irvine, CA (US); Trevor Coolidge, Santee, CA (US); Curtis Michael Rihn, Ladera Ranch, CA (US); Lars Elof Rosenblad, Long Beach, CA (US)

(73) Assignee: THOMPSON AEROSPACE, INC., Irvine, CA (US)

( * ) Notice: Subject to any disclaimer, the term of this patent is extended or adjusted under 35 U.S.C. 154(b) by 332 days.

(21) Appl. No.: 15/454,451

(22) Filed: Mar. 9, 2017

(65) Prior Publication Data
US 2017/0187539 A1  Jun. 29, 2017
US 2017/0366360 A9  Dec. 21, 2017

Related U.S. Application Data

(63) Continuation of application No. PCT/US2015/049898, filed on Sep. 14, 2015.
(Continued)

(51) Int. Cl.
*H04W 12/08* (2021.01)
*H04L 29/06* (2006.01)
(Continued)

(52) U.S. Cl.
CPC .......... *H04W 12/08* (2013.01); *G06F 21/72* (2013.01); *H04B 7/18506* (2013.01); *H04L 9/14* (2013.01); *H04L 9/30* (2013.01); *H04L 9/3263* (2013.01); *H04L 63/0428* (2013.01); *H04L 63/083* (2013.01); *H04L 63/101* (2013.01);
(Continued)

(58) Field of Classification Search
CPC . H04L 9/3263; H04L 9/14; H04L 9/30; H04L 63/0428; H04L 63/083; H04L 63/101; G06F 21/72; H04B 7/18506; H04W 4/046; H04W 12/06; H04W 12/0608;
(Continued)

(56) References Cited

U.S. PATENT DOCUMENTS 6,677,888 B2   1/2004  Roy
2002/0023217 A1*  2/2002  Wheeler ............... G06F 21/32
                                              713/171
(Continued)

OTHER PUBLICATIONS

Search Report and Written Opinion—Corresponding PCT Application No. PCT/US15/49898, dated Dec. 17, 2015, 17 pages.
(Continued)

*Primary Examiner* — Kevin Bechtel
*Assistant Examiner* — Forrest L Carey
(74) *Attorney, Agent, or Firm* — Brion Raffoul; Dennis Haszko (57) ABSTRACT

A method and apparatus that ensures that an aircraft system network controls access by multiple users (403a, 403b, 403c) of electronic devices (402a, 402b, 402c) equipped with a related hardware device (404a, 404b, 404c), by a combination of authentication, integrity, and encryption,
(Continued)

using hardware security such as HSE/HSM or equivalent to establish the credentials for each component that is allowed on the network.

20 Claims, 5 Drawing Sheets

Related U.S. Application Data (60) Provisional application No. 62/050,177, filed on Sep. 14, 2014.

(51) Int. Cl.
| | |
|---|---|
| G06F 21/72 | (2013.01) |
| H04W 12/06 | (2021.01) |
| H04W 12/069 | (2021.01) |
| H04B 7/185 | (2006.01) |
| H04L 9/14 | (2006.01) |
| H04L 9/30 | (2006.01) |
| H04L 9/32 | (2006.01) |
| H04W 84/00 | (2009.01) |

(52) U.S. Cl.
CPC ....... *H04W 12/068* (2021.01); *H04W 12/069* (2021.01); *H04W 84/005* (2013.01)

(58) Field of Classification Search
CPC . H04W 12/068; H04W 12/069; H02W 12/08; H02W 84/005; H02W 12/0609
See application file for complete search history.

(56) References Cited

U.S. PATENT DOCUMENTS

| | | |
|---|---|---|
| 2005/0228558 A1 | 10/2005 | Valette et al. |
| 2008/0192929 A1 | 8/2008 | Knechtel et al. |
| 2010/0039984 A1 | 2/2010 | Brownrigg |
| 2013/0080764 A1 | 3/2013 | Khosravi et al. |
| 2014/0032034 A1 | 1/2014 | Raptopoulos et al. |
| 2014/0053243 A1* | 2/2014 | Walsh ................. H04L 63/0236 726/4 |
| 2014/0075506 A1* | 3/2014 | Davis ..................... H04L 67/12 726/3 |
| 2014/0380433 A1* | 12/2014 | Yerger ................... H04L 67/12 726/4 |

OTHER PUBLICATIONS

European Patent Application No. 15840447.5, Extended Search Report dated Jan. 26, 2018.
Lin Jinyong et al., "The Application Research of Chaotic Stream Cipher in Aircraft Co-operation Data Classified Transmission System", 9th International Conference on Electronic Measurement & Instruments, Aug. 16, 2009, pp. 4-278.
EP Communication received from the European Patent Office for corresponding European Application No. 15840447.5 dated Sep. 19, 2019, 4 pages.

\* cited by examiner

METHOD AND SYSTEM FOR SECURITY AND AUTHENTICATION OF AIRCRAFT DATA TRANSMISSIONS

CROSS REFERENCE TO RELATED APPLICATIONS

The present application is a continuation application from PCT Application PCT/U.S. Ser. No. 15/49898, filed on Sep. 14, 2015, which claims priority from United States Provisional Application 62/050,177 filed on Sep. 14, 2014, the contents of which are herein incorporated in their entirety.

FIELD OF THE INVENTION

The present invention relates to data transmission security, validity, and accessibility for aircraft communications.

BACKGROUND OF THE INVENTION

For most situations involving off-aircraft communications, security has not been addressed. There is no encryption and identification of transmitting and receiving platforms is not hidden or password protected. The systems rely on the verification of aircraft identifiers and special transmission frequencies to prevent malicious interference with aircraft communications.

In some systems, there is encryption of data via one of many encryption schemes, such as Advanced Encryption Standard (AES) or Rivest-Shamir-Adleman (RSA), to protect data such as movie content for in-flight entertainment (IFE) systems or credit card data for point of sale systems. There is no authentication of either party; for instance, an Automatic Dependent Surveillance—Broadcast (ADS-B) transponder could be modified to provide a tail number for an incorrect aircraft, and hence all data provided by the transponder would be incorrect. In general, existing security provisions for the aircraft data path include:

Very High Frequency (VHF) radio communications: identification (ID) by tail number;

Satellite Communications (SATCOM): ID by tail number;

Wi-Fi (Wireless Local Area network" (WLAN) products based on the Institute of Electrical and Electronics Engineers' (IEEE) 802.11 or 802.16 standards): Typically Wi-Fi Protected Access (WPA) with AES encryption and Pre-Shared Key (PSK), WPA2-PSK; and Cellular communications: ID by Subscriber Identification Module (SIM) card, with possible data encryption.

Some existing forms of aircraft data communication today use encryption to protect the data; examples are movie content for IFE systems and credit card information for point of sale systems. Some systems use, or contemplate using, a two factor authentication mechanism (user login plus security token) and industry standard security protocols such as Transport Layer Security (TLS) and its predecessor, Secure Sockets Layer (SSL), public key infrastructure (PKI), AES, WPA2. Several relevant patents, which are hereby incorporated by reference, involve one or more aspect of known communications security provisions. Such documents include:

U.S. Pat. No. 6,816,728 titled AIRCRAFT DATA COMMUNICATION SYSTEM AND METHOD which discloses an aircraft avionics software and database upload transmission/reception system using a cellular data transmission/reception system. This aircraft data communications system and method includes a communications device located in an aircraft; an avionics information storage device located in the aircraft in communication with the communications device; a cellular infrastructure in communication with the communications device; and a computer remotely located from the aircraft in communication with the cellular infrastructure. The communications device and the computer establish a bi-directional communications channel via the cellular infrastructure between the communications device and the computer and initiate a data exchange there between.

U.S. Pat. No. 7,827,400 titled SECURITY CERTIFICATE MANAGEMENT which discloses a system and method for establishing a mutually authenticated secure link between a mobile platform system and a remote system is provided. An onboard computer system (OCS) generates a dynamic certificate and digitally signs the dynamic certificate with a static certificate. The dynamic certificate is transmitted to a remote central computer system (CCS). The CCS verifies that the dynamic certificate is from a trusted source and sends a return dynamic certificate electronically signed with the static certificate to the OCS. The OCS verifies the return dynamic certificate is from the CCS, thereby establishing a mutually authenticated secure link between the OCS and the CCS.

U.S. Pat. No. 8,126,147 titled SECURE TERMINAL DATA LOADER SYSTEM AND IN-FLIGHT ENTERTAINMENT MANAGEMENT SYSTEM which discloses a terminal data loading device on a mobile platform includes a media unit for receiving a transportable media element containing media data and outputting a media signal to a control processor unit. The control processor unit outputs an information signal to a wireline communication unit. The wireline communication unit outputs a wireline signal to a network on the mobile platform.

U.S. Pat. No. 8,169,946 titled AIRCRAFT COMMUNICATIONS SYSTEM WITH HARD HANDOFF AND ASSOCIATED METHODS which discloses a communications system for an aircraft carrying at least some personnel having personal electronic devices (PEDs) for wireless data communications outside the aircraft includes a ground-based communications network comprising spaced apart base stations, and an access point in the aircraft for providing a WLAN for data communications with the PEDs. An air-to-ground transceiver in the aircraft cooperates with the access point for data communications with the ground-based communications network. First and second base stations define respective first and second adjacent coverage areas, and include respective first and second hard handoff controllers. The respective first and second hard handoff controllers implement a hard handoff of a data communications channel with the air-to-ground transceiver as the aircraft moves from the first coverage area to the second adjacent coverage area.

U.S. Pat. No. 8,732,233 titled INTEGRATING PORTABLE ELECTRONIC DEVICES WITH ELECTRONIC FLIGHT BAG SYSTEMS INSTALLED IN AIRCRAFT which discloses an electronic flight bag apparatus includes an electronic flight bag (EFB) system installed in an aircraft and which interfaces with a ground network, and a portable EFB device connectible with the EFB system via a trusted secure connection. This apparatus makes it possible for a flight crew member to remove the portable device from the aircraft, enter flight information into the device in a convenient manner, and transfer the information to the installed EFB system. Auxiliary crew members may use the portable device during flight to assist the flight crew.

U.S. Pat. No. 8,340,067 titled SYSTEMS AND METHODS FOR WIRELESS TRANSFER OF CONTENT BETWEEN AIRCRAFT which discloses a system for wirelessly transferring content between aircraft. The system includes a first local controller positioned on a first aircraft of the plurality of aircraft and a respective second local controller positioned on each of the other aircraft of the plurality of aircraft. The aircraft are positioned on the ground within a boundary of an airport. The first local controller cannot detect a regional controller or any of the second local controllers. The first local controller: identifies content assigned to but not available on the first local controller and the one or more second local controllers, the content assigned by an administrator; detects content available on the first local controller and the one or more second local controllers; and controls transfer of content between the first local controller and the one or more second local controllers.

U.S. Pat. No. 8,369,295 titled METHOD TO PROVIDE CONNECTIVITY AND POWER FOR DIFFERENT AIRCRAFT SUB-SYSTEMS VARYING IN LEVELS OF CRITICALITY AND INTENDED PURPOSES WHILE USING A SINGLE PARTITIONED AIRBORNE LOCAL AREA NETWORK (ALAN) which discloses a system for providing non-flight critical aircraft sub-system communication, over an ALAN, meeting DO-254/DO-178 certification. This system deterministically makes data available to each aircraft sub-system without regard to specific bandwidth requirements. This system network supports functions that are certified on a non-interference basis. The system network deterministically places all non-required functionality into a low priority to assure that all required data functions sets are not dropped. One aspect of this system is how the clients are able to join sessions. In this system, network clients are preprogrammed based on their hardware coding to be able to join a specific VLAN, or VLANs, in accordance with their predetermined functions. The present system is an ALAN based on a ring Ethernet topology, for redundancy, which provides two paths to each connection point without requiring all the wiring associated with a star wiring topology.

U.S. Pat. No. 8,401,021 titled SYSTEMS AND METHODS FOR PRIORITIZING WIRELESS COMMUNICATION OF AIRCRAFT which provides a method for wireless communication of aircraft. The method includes, inter alia, in any feasible order, (1) in accordance with detecting a touchdown of the aircraft, assigning a first priority for transmitting information and a second priority for receiving media content; (2) in accordance with detecting an arrival of the aircraft at the gate, assigning a third priority for receiving media content; (3) in accordance with detecting a departure of the aircraft, assigning the first priority for transmitting information and the second priority for receiving media content; and (4) in accordance with detecting a departure ready of the aircraft, assigning a fourth priority for receiving essential media content and the second priority for receiving other media content. The first priority is greater than the second priority; and the fourth priority is greater than the second priority.

U.S. Pat. No. 8,468,214 titled SYSTEMS AND METHODS FOR DISTRIBUTING CONTENT USING ATTRIBUTES which provides methods and apparatus for distributing content between fixed and nomadic servers using attributes. Attributes may relate to, inter alia, the type of content, location of a fixed and/or nomadic content server, a vehicle that includes a nomadic server, an ability to use content, a need for content, vehicle owner information, and/or time.

U.S. Pat. No. 8,781,512 titled SYSTEMS AND METHODS FOR MANAGING WIRELESS LINKS which provides systems and methods for increasing a combined data rate for communication links between a plurality of radio systems and a plurality of base stations.

U.S. Pat. Nos. 7,486,960, 8,116,797, 8,050,696, and 8,010,141 each titled SYSTEM AND METHOD FOR WIRELESSLY TRANSFERRING CONTENT TO AND FROM AN AIRCRAFT and each which provides a system and method for wirelessly transferring content to and from a vehicle, in particular, an aircraft. The content includes, for example, data, voice, video and multimedia that can be wirelessly exchanged over a wireless communication link between an aircraft and a ground station while the aircraft is at or near a parking gate, or between aircraft. In an example, the system employs long distance metropolitan area technology, such as IEEE Standard 802.16 wireless technology, to increase transfer range. The parameter of the wireless communication link can be adjusted based on, for example, the location of the link. The content can further be provided between the vehicle and ground station based on priorities, such as the available link speed, importance of the information, and/or anticipated connection time between the vehicle and ground station.

Each of these prior methods and systems include various limitations. In terms of communications between aircraft and ground or between aircraft to aircraft, such current communications systems and protocols have no mechanism to ensure that any given communication is coming from the source that it claims it is coming from. This means that a malicious entity could send erroneous data, or intercept data with little effort. It would be advantageous to obviate or mitigate such disadvantages.

SUMMARY OF THE INVENTION

Generally speaking, the present invention solves a security problem with communications between aircraft and ground or between aircraft to aircraft communications. The present invention provides communications systems with a mechanism to ensure that any given communication is coming from the source that it claims it is coming from. This prevents situations where a malicious entity could send erroneous data, or intercept data with little effort. The invention provides the following mechanisms to ensure the security, authenticity and integrity of aircraft/ground and aircraft/aircraft communications:

A mechanism for the receiver of a message to authenticate the source and ensure that the data/message is from a trusted source.

A mechanism for the sender of the message to authenticate the recipient to ensure that the data/message is going to the correct recipient.

A mechanism for the recipient to ascertain that the communication is complete and uncorrupted.

A mechanism for the sender to ascertain that the communication has been received accurately and in full.

A mechanism to encrypt the data.

A mechanism to allow non-pre-approved devices to have guest access to the data.

A mechanism to create and maintain an access control list (ACL) for different users to have different levels of access.

The invention essentially creates a closed-world for aircraft communications, as every platform communicating within the network, both on and off-aircraft, must be equipped with specific identification hardware and software. Such aforementioned mechanisms are of course embodied within the specific identification hardware and software.

Potential specific scenarios that the present invention addresses include, but are not limited to:

- An intruder may try to spoof an aircraft transponder, sending misleading information to air traffic control.
- A flight crew member may download a navigation database from an incorrect source.
- A hacker may try to sniff aircraft data over Wi-Fi.
- A hacker may try to gain access to aircraft data.
- A hacker may try to load unauthorized data onto the system.

In a first aspect, the present invention includes a method of secure authentication for aircraft data transmissions, the method including: provisioning a hardware-based security engine (HSE) located in an aircraft communications system, the HSE having been manufactured in a secure environment and certified in the secure environment as part of an approved network; providing asynchronous authentication, validation and encryption of data by way of the HSE, the HSE in communication with a ground or other aircraft computing system on the approved network; storing user permissions data and connection status data in an access control list used to define allowable data communications paths of the approved network; and enabling communications of the aircraft communications system with a ground or other aircraft computing system subject to the access control list.

In a second aspect, the present invention includes a system for secure authentication of aircraft data transmissions, the system including: an aircraft system including a security engine providing keys and passphrases for asynchronous validation and encryption of aircraft data transmissions, one or more trusted processors for processing aircraft data, a communication mechanism for transmission of the aircraft data via the security engine to a user; a (optional) user device enabling the user to connect to the security engine via the communication mechanism; and an access control list having a list of authorized user devices and users, the list being used to define allowable data communications paths of the aircraft data, the list being updatable by the security engine.

In a third aspect, the present invention includes a system for secure authentication for aircraft data transmissions, the system including: a hardware-based security engine (HSE) located in an aircraft communications system, the HSE having been manufactured in a secure environment and certified in the secure environment as part of an approved network; a means for providing asynchronous authentication, validation and encryption of data by way of the HSE, the HSE in communication with a ground or other aircraft computing system on the approved network; a means for storing user permissions data and connection status data in an access control list used to define allowable data communications paths of the approved network; and a means for enabling communications of the aircraft communications system with a ground or other aircraft computing system subject to the access control list.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

The present invention uses multiple levels of security to ensure that data transmissions are only conducted between trusted components. The invention includes a ground computing system that could be embodied as a cloud server connected to the Internet on the ground, and a series of communicating and computing devices that are installed on an arbitrary (i.e., variable though quantifiable) number of aircraft. These elements are linked by communication media which can be wireless or wired or both. Together, these elements form the inventive system and allow communications between the aircraft and the ground or other off-aircraft platform (such as, but not limited to, satellite) and between aircraft directly. Each aircraft may have more than one of these communicating devices, for redundancy or to perform different functions. Each communicating device installed on the aircraft includes electronics provisioned to communicate off-aircraft via SATCOM, cellular, 802.11, 802.16, HF data link, VHF or other wired (if not in flight) or wireless transmission medium to connect to the ground computing system through the Internet or other data transfer means. The present invention ensures that the combination of the ground computing system and the communicating devices acts as a closed network, even though it is using transmission media that may be susceptible to interception, spoofing or other security breaches.

The present invention includes partitioning of functions into distinct blocks of software and hardware to allow for maximum flexibility for user defined software while providing a hardware-based encryption and validation mechanism that is not accessible or visible to the users. The security/integrity/authentication functions are allocated to grouped system elements which include: a) a ground computing system with hardware security (Hardware Security Module (HSM) known in the computer security art or equivalent) and connection manager; b) an aircraft computing system with a hardware-based security engine (i.e., hardware security engine (HSE)) and connection manager; c) a user device (UD) to provide authentication for a local user; and d) a provisioning function to certify credentials for new hardware that needs to communicate with the system. It should be understood that each element that is interfacing to the network system includes hardware security to establish, store, and authenticate credentials. The ground computing system and aircraft computing system may include other elements, such as data storage elements and processing elements; these are part of closed systems behind the interfacing elements and are protected by the security provisions outlined in the present disclosure.

The ground computing system provides specific keys and random passphrases for aircraft network authentication, integrity, encryption and decryption. The ground computing system exchanges public keys with the aircraft computing system to provide a secure manner of validating and encrypting data. The private keys are never exposed outside the trusted computing system environment.

In a typical implementation, a connection server and an aircraft connection manager processor manage connections without any management of final security or validation of the data. These servers deliver the data and determine the link but have no way to alter or decrypt/encrypt the data used by the system.

The provisioning function is performed in a secure environment (e.g., in a factory setting or otherwise within some physical means of protection) and allows for initial installation of the present invention into the aircraft for service and ensures that root keys (a unique key installed into the integrated circuit during manufacturing) are never exposed. The installation process allows the aircraft server hardware to be configured with permissions for specific operations. This configuration process may be performed after initial delivery, and may be updated without return to the factory, while retaining the integrity and security of the network. Provisioning is typically implemented as a cloud provisioning server, aircraft HSE, and user device.

In an aircraft server, the present embodiment of the invention includes an HSE which validates users that have a user device (UD) (a dongle or equivalent device) that has been provisioned with all security aspects for that given user. It should be understood that the aircraft itself could be considered a user in the broadest sense, and in this manner a separate UD (e.g., dongle) would of course not be necessary as the aircraft HSE would be considered sufficient. In many situations though, multiple user devices can typically exist on board an aircraft. In addition to the security credentials within the UD, the users may be required to provide a user login (username/password) combination (two factor authentication). A user login is not typically required for the aircraft HSE because it is installed and maintained in a controlled environment that is not susceptible to tampering, and the HSE hardware provides physical protection of its security parameters. The system maintains an access control list (ACL) to define the level of access permitted for each approved user. A variety of steps are used to ensure that communications are accurate (i.e., uncorrupted) and complete with end-to-end verification incorporated within the participating servers.

The present invention is useful for any operators of aircraft, from individual owners through commercial passenger and freight airlines. Typical uses are data transfers to/from the aircraft to the ground or between multiple aircraft that require some level of data integrity. Specific applications include the following data transfer functions, though there are many other uses for aircraft communications as the cost becomes less and the availability becomes greater. A nonexclusive list of such functions may include:
Aircraft position data for fleet tracking, individual aircraft tracking and air traffic control.
Aircraft health and performance data for maintenance support, preventive maintenance.
Navigation database download to the aircraft.
Download of maintenance manuals and other supporting documentation.
Download of software updates for modular aircraft components including that of the present invention.
Upload/download of passenger data such as manifests, passenger preferences, and the like.
Upload of credit card data for inflight purchases.
Download of entertainment media for display on an embedded inflight entertainment systems or for distribution to passenger personal entertainment devices.
Software updates for avionics or other computerized aircraft equipment.

Figure 1:
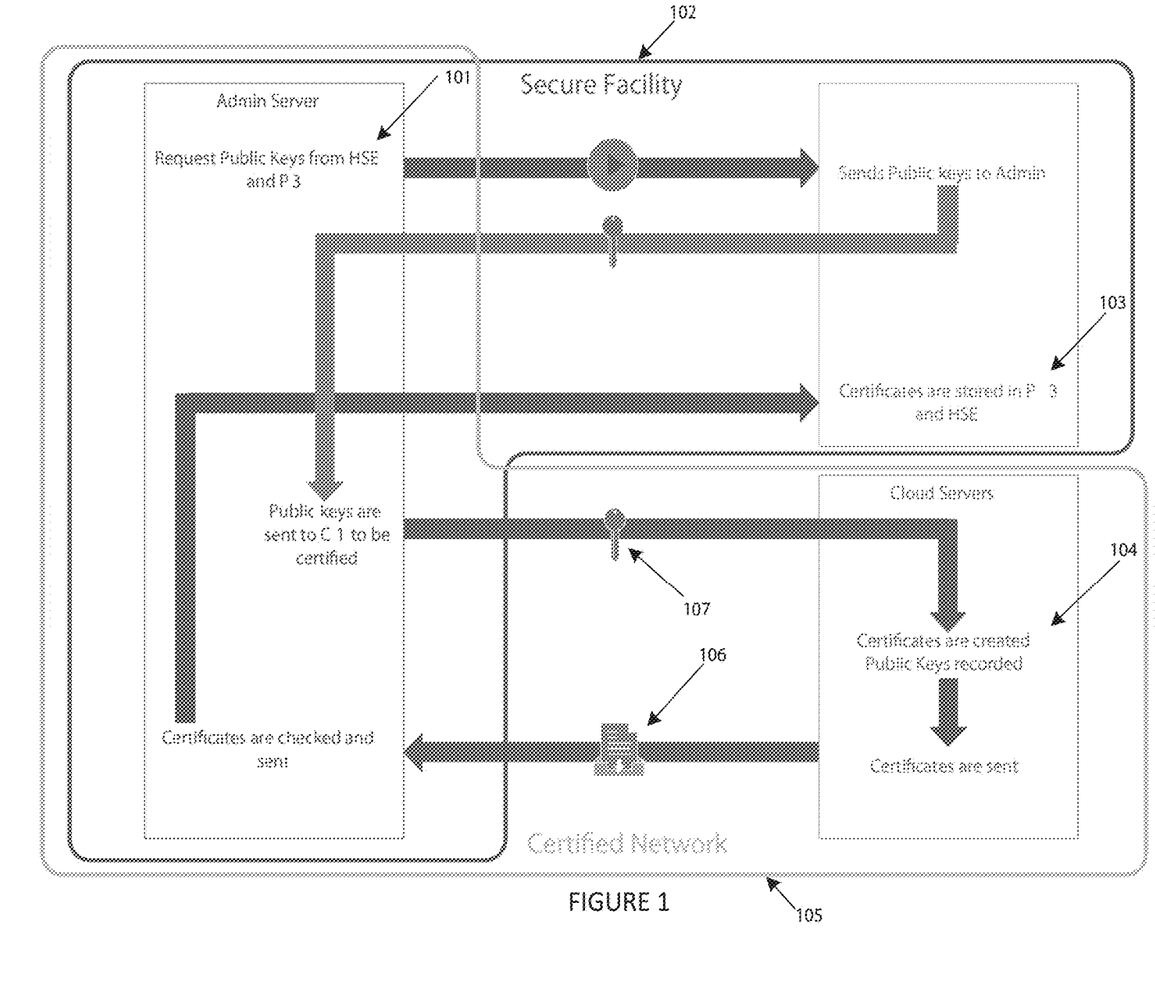
FIG. 1 is a use case chart illustrating an initial process in accordance with the present invention.

With reference to the figures and specific regard to FIG. 1, there is shown a use case illustrating a process in accordance with the inventive method and system. This process establishes the credentials of hardware that will be installed in an aircraft and will be authorized to communicate securely with the ground system or other similarly provisioned aircraft hardware. Initially, a certified administrative server 101 requests the public keys from the manufactured unit 103. The administrative server 101 is encompassed within the secure facility 102 and the certified network 105.

It should be understood that the unit 103 resides in a secure facility 102 with a physical connection with servers on the certified network 105. Within the secure facility 102, the administrative server 101 ensures a secure communication between the elements of the certified network 105 and the manufactured unit 103. The connections 106, 107 between the two certified servers 101, 104 are secured with an open standard connection protocol, e.g. TLS (transport layer security) or VPN (virtual private network). Within cloud servers 104, the public keys are signed by an appropriate certified server and added to a key management system. The process then sends the certificates derived from the manufactured units public keys to the certified administrative server 101. At this point, the administrative server 101 verifies the certificates' authenticity. Afterword, the certificates are sent to the manufactured unit 103. The manufactured unit 103 is now part of the certified system network and can prove so after receiving the certificates.

Figure 2A:
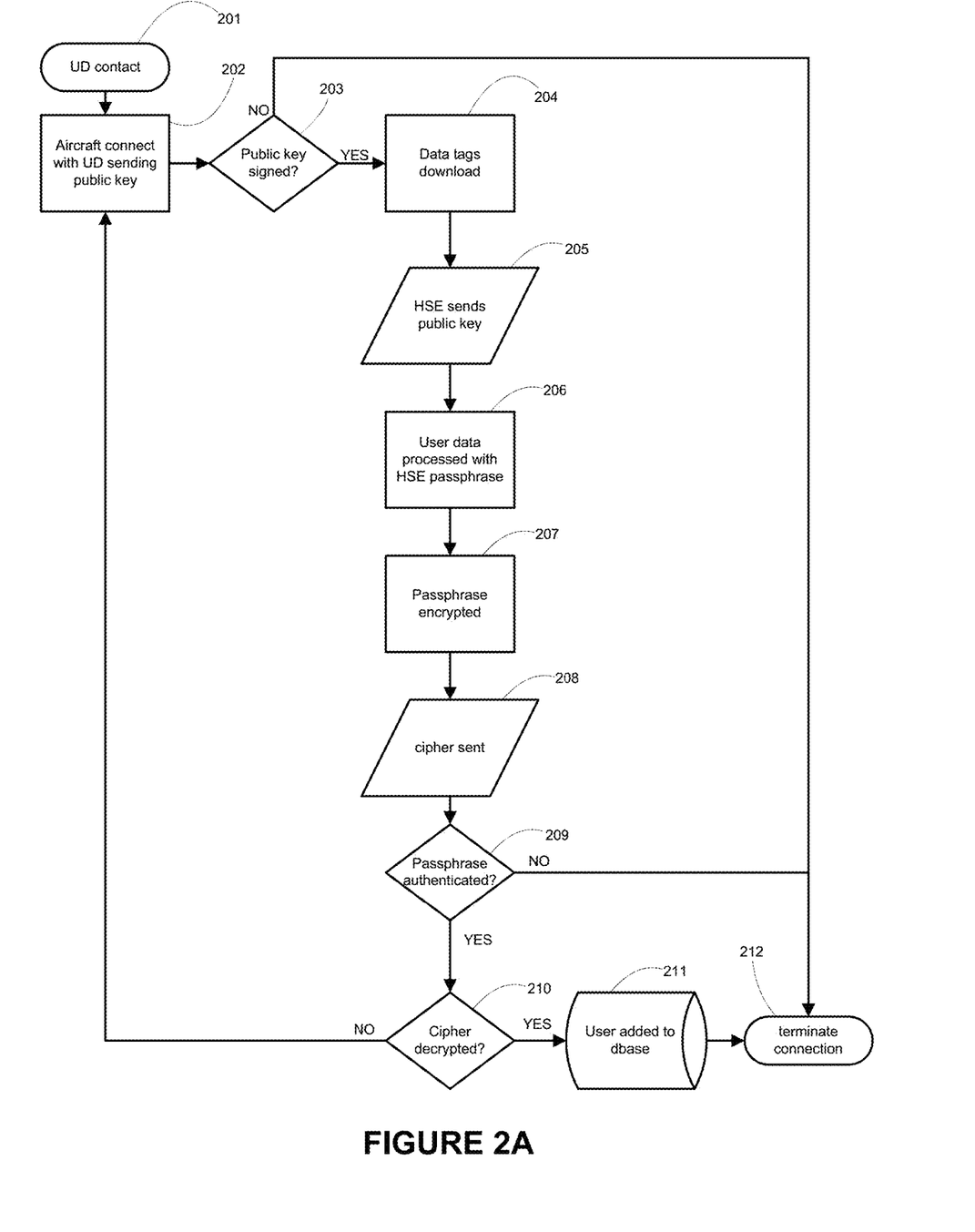
FIG. 2A is a flow chart illustrating the process in accordance with the inventive method and system.

With reference to the figures and specific regard to FIG. 2A, there is shown a flow chart illustrating the process in accordance with the inventive method and system. Initially, a User Device (UD) will come into contact, at step 201, with the aircraft's on-board server. This process initializes the connection between the server and a UD. The user device may be embodied as a Bluetooth dongle, where Bluetooth is the known open standard for short-range radio frequency (RF) communication. The UD is a separate device which can attach to the aircraft system, either via a physical connection or wirelessly (such as through Bluetooth or the like) to establish the presence of an approved user on the aircraft. This can be embodied in a USB stick, a smart card or other form. After the UD comes into range of the server within what is essentially a wireless access point (WAP), then the server and UD create a connection at step 202.

The process at step 202 establishes a connection, typically using a secure protocol such as Bluetooth Security Mode 4. Here, a provisioned passkey is sent from the UD to the security engine on the Aircraft Computing System. At step 203, it is determined whether the public key is signed by a trusted third party. This key signing is described in the provisioning process defined below.

Within step 203, the security engine sends a challenge asking for a public key signed by a trusted party, and the UD responds with a public key and certificate from the trusted party. If the public key determination fails at step 203, then the connection is terminated. However, if the public key determination is successful, then the connection downloads data tags (indicative of e.g., username, password hash, Access Control List (ACL) status) at step 204. The hardware security engine includes a Trusted Platform Module or similar with Public Key Infrastructure (PKI) capability or similar to authenticate interfacing devices. This allows the HSE to verify the public key and certificate and send such key and certificate from the HSE to the UD at step 205. The UD, at step 206, then gathers the user data (i.e., username, password hash, ACL status) and encrypts the data using a passphrase randomly generated by the HSE. At step 207, the passphrase is then encrypted with the HSE public key and signed with the private key of the UD. The cipher text is then sent from the UD to the security engine at step 208.

Once the cipher text is received at the ACS, the signature on the passphrase is authenticated at decision step 209. If the passphrase fails authentication, the communication is deemed untrusted and the connection is terminated. However, if authentication is successful, then the HSE decrypts the cipher text at decision step 210 whereby if the decryption fails at this point, then the connection process reverts back to step 202 so as to restart the connection process between the aircraft server and the UD. If decryption at step 210 is successful, then the security engine stores the user data in an ACL for later use when the user logs in with a device through the wireless connection as shown and described with regard to FIG. 2B. Upon successful addition of the user data in the ACL at step 211, the process is complete and the connection is terminated at step 212.

It should be understood that the provisioning process outlined herein with regard to FIG. 2A is automated such that any time a UD initiates contact within range of the aircraft server, the UD will be subject to the inventive process. By way of the above described process, the inventive process thus provides for asynchronous establishment and validation of a secure communications link and subsequent encryption, transfer and decryption of data. Because the present invention utilizes existing and/or future backbone communications protocols (e.g., off-aircraft communications via SATCOM, cellular, 802.11, 802.16, HF data link or other wired (if not in flight) or wireless transmission medium), the system of the present invention essentially establishes a private network within the open-world communications protocols used for off-aircraft communications.

Figure 2B:
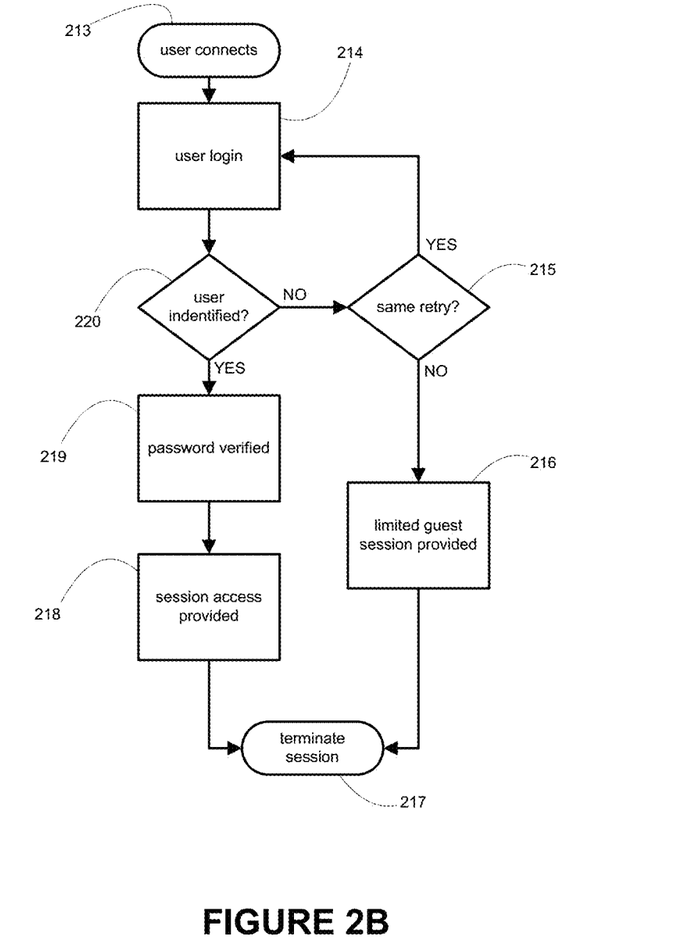
FIG. 2B is a flow chart illustrating an additional process in accordance with the inventive method and system.
Figure 4:
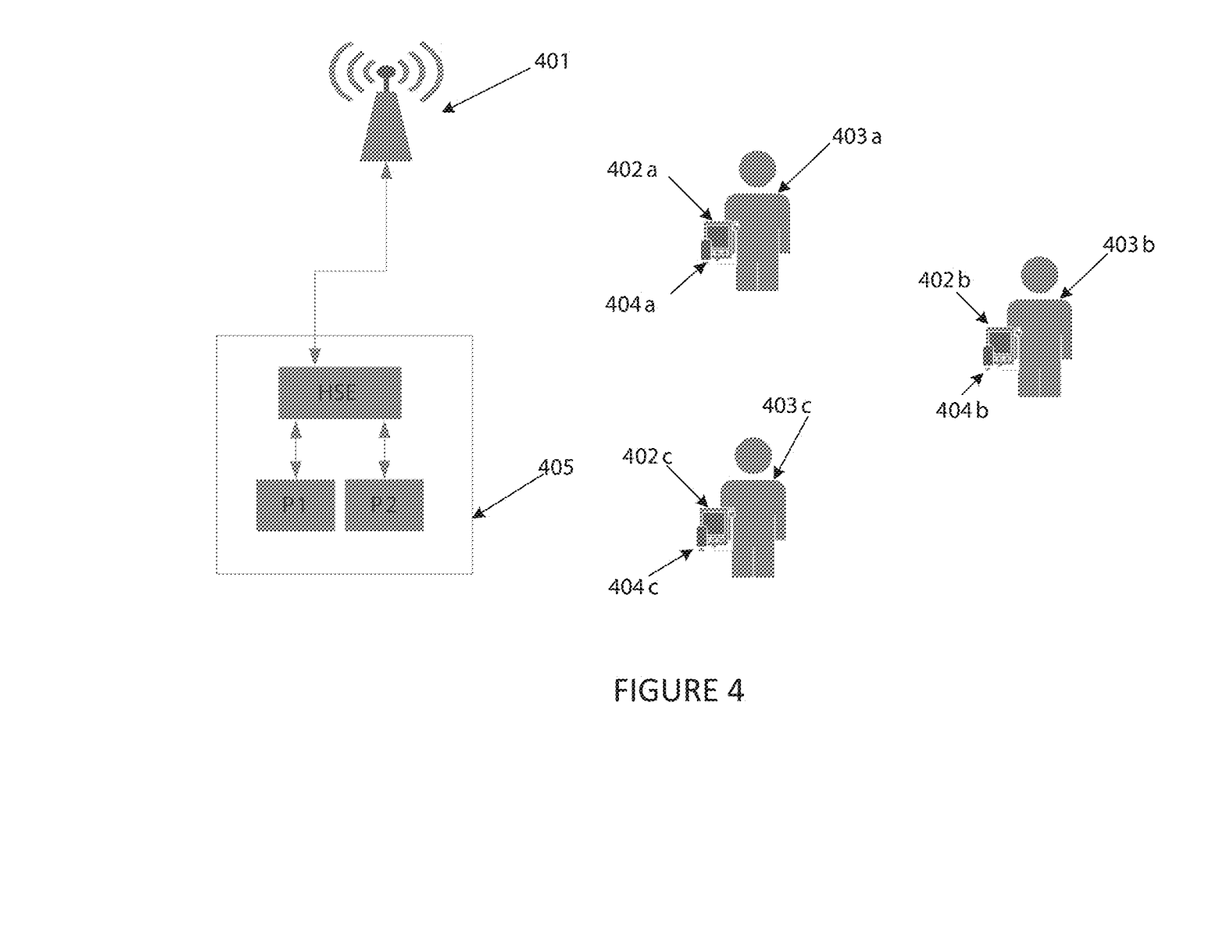
FIG. 4 is a schematic diagram illustrating a possible arrangement of users in accordance with the present invention.

With regard to FIG. 2B, there is shown a flow chart illustrating the additional process in accordance with the inventive method and with further reference to FIG. 4 the inventive system whereby the user logs in with a device through the wireless connection (e.g. the aircraft's Wireless Access Point (WAP)). It should be readily apparent that the user's electronic device may be any general electronic product such as, but not limited to, a laptop, tablet, personal digital assistant (PDA), or any specific aircraft-related electronic product such as, but not limited to, an electronic flight bag or navigational device. Any such user's device would require a user device in a suitable form as earlier described and specifically mentioned as the UD. The user would physically connect their UD to their electronic device.

As shown in FIG. 4, each user 403a, 403b, 403c is provided with an electronic device 402a, 402b, 402c and corresponding dongle 404a, 404b, 404c. A radio mechanism 401 enables wireless communication between the aircraft server 405 and each electronic device through a related dongle. Through the user interface on the given electronic device, the user would initially navigate, at step 213 in FIG. 2B, to the airplane computing system connection portal, which could be a web page, available wirelessly over the aircraft intranet.

After this connection at step 213, the user would then provide their username and password so as to log in to the aircraft server at step 214. At this point, the username is checked to determine whether the username is included in the ACL. If this determination step 220 fails, then the user is given the choice at step 215 to either retry their username and password or proceed as a guest. If a guest login is selected the user is granted guest access with related limited access, at step 216. If the determination step 220 is successful, then the security engine verifies at step 219 the username and password provided with the corresponding information acquired from the UD during the provisioning process as described previously with regard to FIG. 2A. Thereafter, a session is provided at step 218 to the user as an access level dictated by the ACL. The session will terminate at step 217 by either an affirmative logout by the user or by timing out due to inactivity.

The inventive process is useful in processing data requests under the ARINC 834 standard. ARINC 834 defines an aircraft data interface that sources data to Electronic Flight Bags, airborne file servers and the like. In such an instance, the user would request specific information to receive. The UD and user are authenticated using the process outlined with regard to FIGS. 2A and 2B. If data requested is accessible by the user per their rights dictated by the ACL, then the security engine would open a port and multicast address for the data to be streamed out of at the rate chosen by the user. The user in turn would listen for messages on the port and multicast address specified by the security engine and thereby receive such data.

Figure 3:
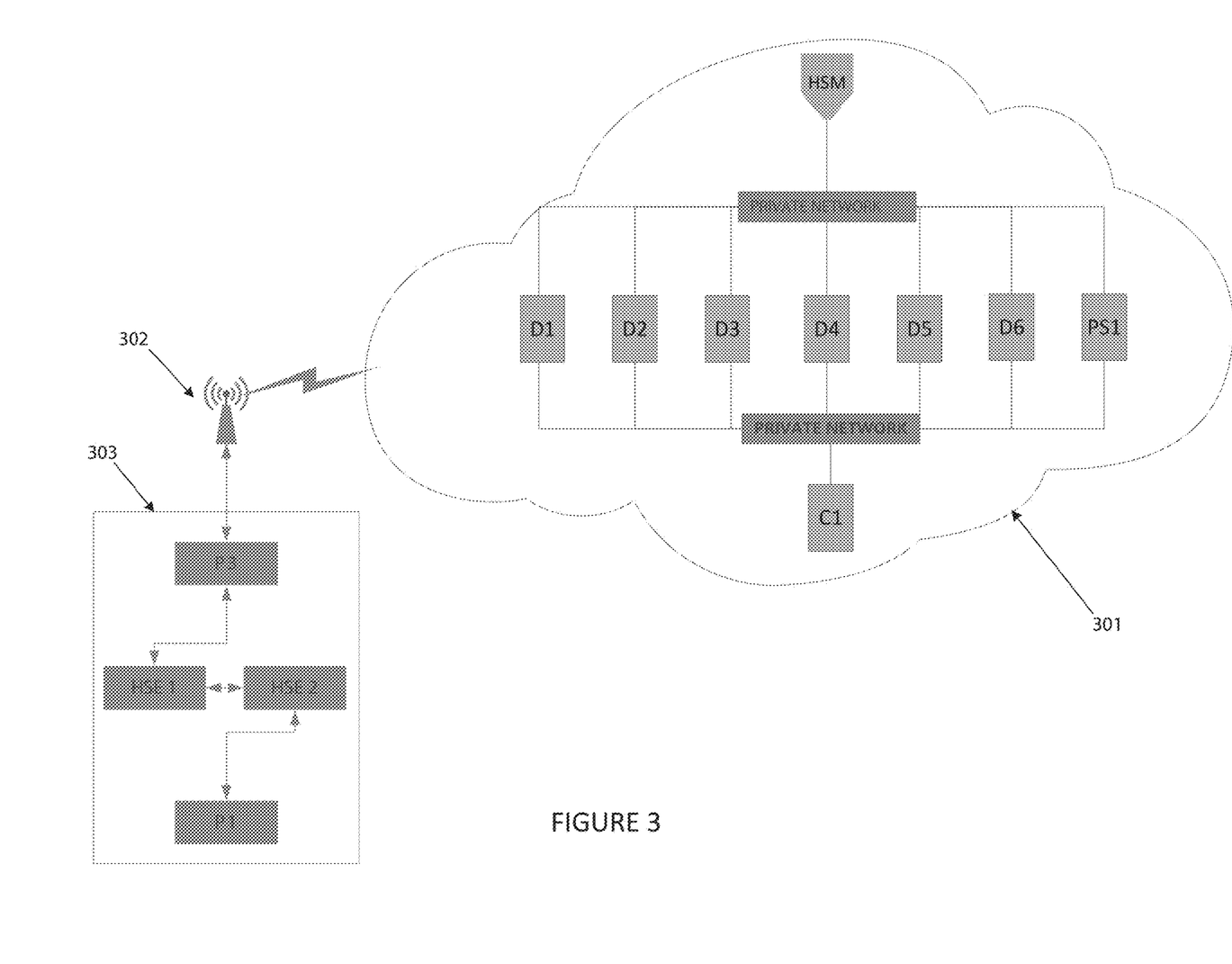
FIG. 3 is a schematic diagram illustrating the system elements in accordance with the present invention.

The inventive process is likewise useful in securely processing data between a cloud server and the aircraft server. In this way, a user aboard an aircraft may securely connect with the aircraft server as discussed above and which aircraft server may securely connect with remote resources and/or other aircraft. In this regard, FIG. 3 is a schematic diagram illustrating the system elements in accordance with the present invention in a cloud computing environment. Here, a cloud environment 301 is provided representing a shared pool of configurable computing resources. Such computing resources may include a private network of data servers D1 through D6 along with a provisioning server PS1, and which servers may of course be of many different computing architectures without straying from the intended scope of the present invention.

The cloud environment 301 in accordance with the present invention would also include at least one server indicated in FIG. 3 as HSM including or with access to a hardware security module. A cloud connection server C1 would be provided so that the private network in the cloud environment 301 would be in communication with aircraft server 303, in this case via radio device 302. The aircraft server 303 may include at least a hardware security engine HSE1, and a remote connection manager P3 which together process connection key pairs (public key/private key) between the cloud and the aircraft. The aircraft server 303 may include additional hardware security engines HSE2, and a local processor P1 which would process and store data moving off and on the aircraft server 303.

The aircraft HSE1 and HSE2 are layered security elements as defined by the standard RTCA/DO-356 ("Airworthiness Security Methods and Considerations" which provides guidance to assess security risk in airborne electronics, published by RTCA, Incorporated). Having layered security forces any security threat to defeat both aircraft HSEs independently, thereby increasing the effectiveness of the systems security. Initialization of a connection between the aircraft server 303 and any given data server D1 through D6 in the cloud environment 301 is accomplished in a similar manner as that discussed with regard to the process of FIG. 2A. Here, the connection manager P3 within the aircraft server 303 initiates a connection to the cloud connection server C1 using a known secure protocol such as secure shell version 2 (SSHv2) protocol. The cloud connection server C1 challenges the identity of the aircraft server 303 using either the aircraft-side public key of the aircraft server 303 provisioned on the cloud connection server C1 or from a previous session. The connection manager P3 then reads the challenge using the aircraft-side private key of the aircraft server 303. The connection manager P3 responds to the challenge using the cloud connection server C1 public key. The cloud connection server C1 will then verify the challenge response from the connection manager P3 and verify the identity of the connection manager P3.

The aircraft server 303 challenges the identity of the cloud connection server C1 using the public key of the connection server C1 provisioned from the provisioning server PS1 from the previous session. The cloud connection server C1 then reads the challenge using the cloud-side private key of the connection server C1. The cloud connection server C1 responds to the challenge using the connection mangers P3 public key. The aircraft connection manager P3 will then verify the challenge response from the cloud connection manager C1 and verify the identity of the cloud connection manager C1. The hardware security engine (HSE1) in the aircraft server 303 then creates a new aircraft-side key pair of which the connection manager P3 sends over the new aircraft-side public key to the cloud. Likewise, the given cloud data server D1 through D6 via the HSM in the cloud environment 301 then creates a new cloud-side key pair of which the cloud connection server C1 sends over the new cloud-side public key to the aircraft.

Data transfer between the aircraft and the cloud will now be discussed in terms of upload to the cloud and download to the aircraft.

During upload of data from the aircraft server 303 to the cloud environment 301, the security engine HSE1 in the aircraft server 303 creates a one-time passphrase for AES encryption. The security engine HSE1 then encrypts data for uploading using AES and which is stored on trusted (i.e., closed world) processors within the aircraft server 303. The upload data is then moved by the security engine HSE1 to the connection manager P3 which then signs the upload data package with an aircraft-side connection private key. The security engine HSE1 then encrypts the AES passphrase with the cloud-side public key from the cloud connection server C1 and signs the encrypted passphrase with the new cloud-side private key (formed at initialization discussed above). The now signed and encrypted AES passphrase is then sent to the connection manager P3 which then sends the upload to the cloud connection server C1.

Once the upload is received by the cloud connection server C1, the cloud connection server C1 then verifies the upload package with the aircraft-side public key of the connection manager P3 which was used to make the connection (such key having been stored on the cloud connection server C1 during provisioning). The cloud connection server C1 then transmits data and key to the given cloud data server D1 through D6 which then verifies the passphrase with the new aircraft-side public key and decrypts the encrypted passphrase with the new cloud-side private key. At this point, the given cloud data server D1 through D6 has the AES passphrase and will decrypt the uploaded data package for further processing. Once the passphrase is verified and decrypted and the uploaded data package is successfully decrypted for further processing, then a file stating that the upload was successful will be placed on to the outbox of the cloud connection server and signed with the new cloud-side private key.

On the aircraft-side, the connection manager P3 checks the cloud connection server C1 for a file tagged with the upload's unique identifier. Once such file is identified, the connection manager P3 pulls down the file and verifies it with the new cloud-side public key. If the file states that the upload was successful, the package will be stored for 14 more flights or 30 days or terms deemed appropriate and the file will be deleted on the cloud connection server. If the file fails to indicate successful upload, then the connection manager P3 with retry sending the upload to the cloud connection server C1.

During download of data from the cloud environment 301 to the aircraft server 303, the connection manager P3 (after session initiation) checks the outbox of the cloud connection server C1. On the cloud-side, the given cloud data server D1 through D6 via the HSM in the cloud environment 301 encrypts the download data package with AES cipher block chaining (CBC) and encrypts the AES passphrase with the new aircraft-side public key from the aircraft server (formed at initialization discussed above). The passphrase is then signed by the new cloud-side private key of the given cloud data server D1 through D6. The signed and encrypted passphrase and encrypted download data package are then sent to the cloud connection server C1 whereby the package is signed with the cloud-side private key of the connection server C1. The passphrase and package are then placed in the outbox of the connection server C1 and marked for the unique aircraft server 303.

As mentioned, the connection manager P3 will have been checking the outbox of the cloud connection server C1. Once the connection manager P3 successfully pulls down the package and passphrase, the connection manager P3 verifies the passphrase using the cloud-side new public key of the given cloud data server D1 through D6 and verifies the package using the cloud-side public key of the cloud connection server C1. Once verified, the package and passphrase are given to the security engine S1 which decrypts the passphrase with the new aircraft-side private key and decrypts the package with the AES passphrase. If all is successful, the package on the cloud connection server C1 is marked successful by the connection manager P3, and the cloud connection server C1 then archives the package.

As part of maintaining system integrity, rotation of connection keys may occur. In such instance, the aircraft server 303 will initiate a session whereby the connection manager P3 creates a new connection key pair. The connection manager sends a new public key to the cloud connection server C1. On the cloud side, the connection server C1 adds the new public key to the ACL and removes the old key from the ACL. The new connection public key hash is then sent to the connection manager P3. Once the connection manager P3 replaces the old host public key hash with the new one, the session is ended.

By way of the aforementioned method and apparatus, the present invention ensures that the system network controls access by non-approved devices through a combination of authentication and encryption, using HSM/HSE or similar hardware means to establish the credentials for each component that is allowed on the network.

It should be understood that for purposes of the present invention, the hardware security engine is located in the aircraft server. The connection manager P3 is a hardware based processor located in the aircraft server 301. The aircraft HSE (HSE1, HSE2) is a complex device as defined by the standard RTCA/DO-254 ("Design Assurance Guidance for Airborne Electronic Hardware" which provides guidance for the development of airborne electronic hardware, published by RTCA, Incorporated). The aircraft HSE consists of one or more application-specific integrated circuits (ASICs) which include a root key and other security facilities located within the aircraft server 303 which provides authentication data for establishing communications off-aircraft. The cloud connection server C1 is the specific cloud server communicating directly with the aircraft server 303. P1 and P3 are closed world or trusted processors located in the aircraft server. The cloud data servers (1 through N, where N is an integer greater than or equal to one) are the cloud servers for storing, manipulating and passing along aircraft communications data. The cloud HSM is the cloud entity which maintains the security keys for all aircraft communications. The cloud provisioning server PS1 is the cloud server which can provision a new or repurposed aircraft server with initial authentication information to be able to connect to the cloud connection server.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method of secure authentication for aircraft data transmissions on an aircraft, said method comprising:
    provisioning a hardware-based security engine (HSE) located in an aircraft communications system, said HSE having been manufactured in a secure environment and certified in said secure environment as part of an approved network;
    performing asynchronous authentication, validation and encryption of data using said HSE, said HSE in communication with a ground or other aircraft computing system on said approved network, said approved network consisting of a closed system;
    storing user permissions data and connection status data in an access control list used to define allowable data communications paths of said approved network;
    enabling communications of said aircraft communications system with a ground or other aircraft computing system subject to said access control list;
    said step of performing asynchronous validation and encryption of data using said security engine including identifying a user device (UD) that incorporates credentials embodied in hardware using a hardware-based module provisioned with one or more security aspects for securing said closed system,
    said security aspects comprising said hardware-based module communicating with a user of said user device and said HSE,
    wherein said UD performs a data transfer function selected from a group consisting of:
    transfer of aircraft position data for fleet tracking, individual aircraft tracking and air traffic control,
    transfer of aircraft health and performance data for maintenance support or preventive maintenance,
    transfer of navigation data to the aircraft,
    transfer of maintenance manuals to the aircraft, and
    transfer of software updates to modular aircraft components, avionics, or computerized aircraft equipment on the aircraft; and
    wherein said data transfer function is enabled between the aircraft and the ground computing system and said data transfer function transfers data directly between the aircraft and a second aircraft.

2. The method as claimed in claim 1 wherein said method precludes sending data to, receiving data from, and corrupting data by denying access to all nonauthorized UDs.

3. The method as claimed in claim 1 wherein said providing asynchronous validation and encryption of data by way of said security engine includes initializing a connection between said aircraft server and said hardware-based user device, said initializing including
    verification of a public key and certificate provided by said user device (UD), and
    verification of a passphrase and user identification corresponding to said user.

4. The method as claimed in claim 3 further including updating said access control list to reflect results of said initializing.

5. The method as claimed in claim 4 further including a session login procedure whereby upon successful username and user password determination said user is provided access to information on said aircraft server subject to said access control list.

6. The method as claimed in claim 5 wherein
    an aircraft system is said user of said information, and
    transmissions of said information are routed to and from said aircraft system via hardware connection to said HSE which provides physical security of said information.

7. The method as claimed in claim 6 wherein said UD includes one or more user dongles located on said aircraft.

8. A system for secure authentication of aircraft data transmissions on an aircraft, said system comprising:
    an aircraft system including
    a hardware-based security engine (HSE), said HSE having been manufactured in a secure environment and certified in said secure environment as part of an approved network, providing keys and passphrases for performing asynchronous authentication, validation and encryption of aircraft data transmissions within said approved network consisting of a closed system, said security engine securing said closed system via credentials,
    one or more trusted processors for processing aircraft data,
    a communication mechanism for communicating with a ground or other aircraft computing system on said approved network and transmission of said aircraft data via said security engine to a user;
    a user device including said credentials embodied in hardware, wherein performing asynchronous authentication, validation, and encryption of data using said security engine includes identifying said user device (UD) using a hardware-based module provisioned with one or more security aspects for securing said closed system,
    said security aspects comprising said hardware-based module communicating with the user of said user device and said HSE;
    wherein said user device performs a data transfer function selected from a group consisting of:
    transfer of aircraft position data for fleet tracking, individual aircraft tracking and air traffic control,
    transfer of aircraft health and performance data for maintenance support or preventive maintenance, transfer of navigation data to the aircraft, transfer of maintenance manuals to the aircraft, and transfer of software updates to modular aircraft components, avionics, or computerized aircraft equipment on the aircraft;

wherein said data transfer function is enabled between the aircraft and the ground computing system and said data transfer function transfers data directly is enabled between the aircraft and a second aircraft; and an access control list for storing user permissions data and connection status data and having a list of authorized user devices and users, said list being used to define allowable data communications paths of said aircraft data on said approved network, said list being updatable by said security engine.

9. The system as claimed in claim 8 wherein said communication mechanism is wireless.

10. The system as claimed in claim 8 wherein said communication mechanism is hardwired.

11. The system as claimed in claim 8 wherein said user device is a predefined user dongle connectable to an electronic device, said dongle embedded with security hardware to allow said user access to said aircraft data subject to defined security policies of said access control list.

12. The system as claimed in claim 8 wherein said user device is an electronic device embedded with security hardware to allow said user access to said aircraft data subject to defined security policies of said access control list.

13. The system as claimed in claim 8 further including a distributed network having a cloud connection server to manage data transmission links between said aircraft server and said cloud-based network, including authorization of said link, a cloud provisioning server to initialize said aircraft server with initial authentication information to be able to connect to said cloud connection server, a ground HSM providing specific keys and random passphrases to a plurality of cloud data servers, and a plurality of ground servers operable with said security engine and said ground HSM for credential verification, data validation, data encryption/decryption, and public key management.

14. A system for secure authentication for aircraft data transmissions on an aircraft, said system comprising:

a hardware-based security engine (HSE) located in an aircraft communications system, said HSE having been manufactured in a secure environment and certified in said secure environment as part of an approved network, said approved network consisting of a closed system;

a means for performing asynchronous authentication, validation, and encryption of data using said HSE, said HSE in communication with a ground or other aircraft computing system on said approved network;

a means for storing user permissions data and connection status data in an access control list used to define allowable data communications paths of said approved network;

a means for enabling communications of said aircraft communications system with a ground or other aircraft computing system subject to said access control list;

wherein said means for performing asynchronous authentication, validation, and encryption of data using said security engine includes a means for identifying a user device (UD) that incorporates credentials embodied in hardware using a hardware-based module provisioned with one or more security aspects for securing said closed system, said security aspects comprising said hardware-based module communicating with a user of said user device and said HSE;

wherein said user device performs a data transfer function selected from a group consisting of:

transfer of aircraft position data for fleet tracking, individual aircraft tracking and air traffic control, transfer of aircraft health and performance data for maintenance support or preventive maintenance, transfer of navigation data to the aircraft, transfer of maintenance manuals to the aircraft, and transfer of software updates to modular aircraft components, avionics, or computerized aircraft equipment on the aircraft; and wherein said data transfer function is enabled between the aircraft and the ground computing system and said data transfer function transfers data directly between the aircraft and a second aircraft.

15. The system as claimed in claim 14 wherein said system precludes sending data to, receiving data from, and corrupting data by denying access to all nonauthorized UDs.

16. The system as claimed in claim 14 wherein said means for providing asynchronous validation and encryption of data by way of said security engine includes a means for initializing a connection between said aircraft server and said hardware-based user device, said initializing including a means for verification of a public key and certificate provided by said user device (UD), and a means for verification of a passphrase and user identification corresponding to said user.

17. The system as claimed in claim 16 further including a means for updating said access control list to reflect results of said initializing.

18. The system as claimed in claim 17 further including a means for a session login procedure whereby upon successful username and user password determination said user is provided access to information on said aircraft server subject to said access control list.

19. The system as claimed in claim 18 wherein an aircraft system is said user of said information, and transmissions of said information are routed to and from said aircraft system via hardware connection to said HSE which provides physical security of said information.

20. The system as claimed in claim 19 wherein said UD includes one or more user dongles located on said aircraft.

* * * * *